United States Patent Office 2,754,316
Patented July 10, 1956

2,754,316

METHOD OF MAKING FLUORINATED PHOSPHATE ESTERS AND RESULTING NEW COMPOSITIONS

James C. Conly, Santa Monica, Calif., assignor to Douglas Aircraft Company, Inc., Santa Monica, Calif.

No Drawing. Application March 17, 1951,
Serial No. 216,271

20 Claims. (Cl. 260—461)

This invention relates to a new method for preparing certain mixed fluorinated esters of ortho-phosphoric acid and to the resulting new mixed phosphate esters as new chemical compounds, and relates more particularly to a process for the production of such fluorinated phosphates and to the resulting new fluorinated phosphates as new chemical compounds of the general formula

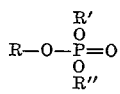

wherein R represents an aryl radical having from 6 to 10 carbon atoms; R' represents a fluorinated alkyl radical having from 2 to 10 carbon atoms and having a $CF_2$ or $CF_3$ group, that is, having a fluorinated carbon atom with at least 2 fluorine atoms, bonded to the carbon atom connected to an oxygen of the phosphate radical and the carbon atom bonded to the oxygen of the phosphate radical is bonded, in addition to the bond to this oxygen, only to atoms which are members of the group consisting of hydrogen and carbon; or a fluorinated alkoxylkyl radical containing from 3 to 10 carbon atoms with at least 2 carbon atoms in the alkyl portion thereof and having a $CF_2$ or $CF_3$ group, that is, having a fluorinated carbon atom with at least 2 fluorine atoms, bonded to the carbon atom connected to an oxygen of the phosphate radical and the carbon bonded to the oxygen of the phosphate radical is bonded, in addition to the bond to this oxygen, only to atoms which are members of the group consisting of hydrogen and carbon; and R" represents an aryl radical having from 6 to 10 carbon atoms; a fluorinated alkyl radical having from 2 to 10 carbon atoms and having a $CF_2$ or $CF_3$ group, that is, having a fluorinated carbon atom with at least 2 fluorine atoms, bonded to the carbon atom connected to an oxygen of the phosphate radical and the carbon atom bonded to the oxygen of the phosphate radical is bonded, in addition to the bond to this oxygen, only to atoms which are members of the group consisting of hydrogen and carbon; or a fluorinated alkoxyalkyl radical containing from 3 to 10 carbon atoms with at least 2 carbon atoms in the alkyl portion thereof and having a $CF_2$ or $CF_3$ group, that is, having a fluorinated carbon atom with at least 2 fluorine atoms, bonded to the carbon atom connected to an oxygen of the phosphate radical and the carbon bonded to the oxygen of the phosphate radical is bonded, in addition to the bond to this oxygen, only to atoms which are members of the group consisting of hydrogen and carbon.

My invention more particularly relates to the production of fluoroalkyl-aryl phosphates, particularly monoaryl difluoroalkyl and diaryl mono-fluoroalkyl phosphates.

The compounds of this invention prepared by the novel process of this invention are generally nearly colorless liquids having mild pleasant odors. These esters have exceptional utility as flexibilizing plasticizers for fluorinated polymers, as non-flammable hydraulic fluids, or as stable liquid heat-transfer agents, in addition to many other uses based on their low viscosity at low temperatures, high stability and extraordinary fire resistance.

In general, in accordance with the process of my invention, I react phosphorous oxychloride with 1 mol of the aromatic alcohol and 2 mols of the fluorinated aliphatic alcohol to make a phosphate having one aromatic radical and two fluorinated aliphatic radicals, and react phosphorous oxychloride with 1 mol of fluorinated aliphatic alcohol and 2 mols of the aromatic alcohol to make a phosphate having two aromatic radicals and one fluorinated aliphatic radical.

The following examples will illustrate my invention:

Example 1

1 mol of $POCl_3$, cooled to 5° C., was added with good stirring to a solution of 1 mol (200 grams) of 2,2,3,3,4,4-heptafluorobutyl alcohol and 2 mols of phenol (288 grams) in 1000 cc. of a 12% solution of sodium hydroxide at 5° C. at such a rate that the temperature at no time exceeded 8° C. After addition was complete, stirring continued for one hour at 5° C., and then the mixture allowed to warm slowly to room temperature. The oil layer was separated from the water layer and the water layer washed once with a little ethyl ether to remove any residual ester suspended in the water, and then the combined oil layers were washed with 2% NaOH solution and with water and then dried under vacuum. Of the resultant neutral oily ester, the following amounts were obtained on distillation: about 10% tris 2,2,3,3,4,4,4-heptafluorobutyl phosphate having a boiling point of 65–70° C./0.5 mm.; about 20% of di-2,2,3,3,4,4,4-heptafluorobutyl phenyl phosphate having a boiling point of 93–96° C./1 mm.; about 60% of mono-2,2,3,3,4,4,4-heptafluorobutyl diphenly phosphate having a boiling point of 127–130° C./1 mm. and about a 10% residue of tris phenyl phosphate.

Example 2

Phosphorous oxychloride was reacted with phenol and the heptafluorobutanol in the same way as in Example 1, except that for 1 mol of phosphorous oxychloride 2 mols of the heptafluorobutanol and 1 mol of phenol were used. In this example from the resultant neutral oily ester, the following amounts were obtained on distillation: about 20% tris 2,2,3,3,4,4,4-heptafluorobutyl phosphate having a boiling point of 65–70° C./0.5 mm.; about 60% of di-2,2,3,3,4,4,4-heptafluorobutyl phenyl phosphate having a boiling point of 93–96° C./1 mm.; about 10% of mono-2,2,3,3,4,4,4-heptafluorobutyl diphenyl phosphate having a boiling point of 127–130° C./1 mm. and about a 10% residue of tris phenyl phosphate.

Example 3

Using the heptafluorobutanol and cresol instead of phenol as in Example 1, 2,2,3,3,4,4,4-heptafluorobutyl dicresyl phosphate was made having a boiling point of 132–136° C./1 mm.

Although the exact concentrations and temperatures used are not critical, it is preferred that the temperature in general be kept fairly low, that is, below 10° C. and preferably within the range of 5° C. to —5° C.

My invention also includes the production of the mixture of phoshates resulting from the reaction illustrated in the foregoing examples, particularly including a mixture of the tris fluoroalkyl phosphate, monofluoroalkyl diaryl phoshate, monoaryl difluoroalkyl phosphate and triaryl phosphate. Such a mixture of phosphates has been found useful as pointed out above. From this mixture a mixture of the three fluorinated phosphates may be separated from the triaryl phosphate so as to have a mixture of trifluoroalkyl, monofluoroalkyl diaryl, and monoaryl difluoroalkyl phosphates. Such a mixture of the three fluorinated phosphates has likewise been found to be useful as pointed out above. Also a similarly useful mixture of the mono-aryl di-fluoroalkyl phosphate and mono-fluoroalkyl di-aryl phosphate may be separated.

In accordance with my invention, the aromatic alcohols which may be used particularly include phenol, chlorophenol, cresol and xylol.

The fluorinated alcohols from which the fluorinated alkoxy radicals for my invention may be derived may be represented by the formula $$C_nF_{2n+1-m}H_mCF_2\underset{R'}{\overset{R}{C}}\!\!-\!\!OH$$

in which $m$ is less than or equal to $2n+1$ and $n$ may have any value from 0 to 4, and R and R' may be hydrogen or alkyl radicals. These particularly include those represented by the following formulas:

$CF_3CH_2OH$
$CF_3CF_2CH_2OH$
$CF_3(CF_2)_2CH_2OH$
$CF_3(CF_2)_3CH_2OH$
$CF_3(CF_2)_4CH_2OH$
$CF_3(CF_2)_5CH_2OH$
$CF_3(CF_2)_6CH_2OH$
$CF_3CHOHC_2H_5$
$CF_3CHOHC_3H_7$
$CF_3CHOHC_4H_9$
$CF_3CHOHC_5H_{11}$
$CF_3CHOHC_6H_{13}$
$CF_3CHOHC_7H_{15}$
$CF_3CHOHC_8H_{17}$
$CF_3CF_2CHOHC_2H_5$
$CF_3CF_2CHOHC_3H_7$
$CF_3CF_2CHOHC_4H_9$
$CF_3CF_2CHOHC_5H_{11}$
$CF_3CF_2CHOHC_6H_{13}$
$CF_3CHOHC_7H_{15}$
$CF_3CF_2CHOHC_8H_{17}$
$CF_3(CF_2)_2CHOHC_2H_5$
$CF_3(CF_2)_2CHOHC_3H_7$
$CF_3(CF_2)_2CHOHC_4H_9$
$CF_3(CF_2)_2CHOHC_5H_{11}$
$CF_3(CF_2)_2CHOHC_6H_{13}$
$CF_3(CF_2)_2CHOHC_7H_{15}$
$CF_3(CF_2)_2CHOHC_8H_{17}$
$CF_3(CF_2)_3CHOHC_2H_5$
$CF_3(CF_2)_3CHOHC_3H_7$
$CF_3(CF_2)_3CHOHC_4H_9$
$CF_3(CF_2)_3CHOHC_5H_{11}$
$CF_3(CF_2)_3CHOHC_6H_{13}$
$CF_3(CF_2)_3CHOHC_7H_{15}$
$CF_3(CF_2)_3CHOHC_8H_{17}$
$CF_3(CF_2)_4CHOHC_2H_5$
$CF_3(CF_2)_4CHOHC_3H_7$
$CF_3(CF_2)_4CHOHC_4H_9$
$CF_3(CF_2)_4CHOHC_5H_{11}$
$CF_3(CF_2)_4CHOHC_6H_{13}$
$CF_3(CF_2)_4CHOHC_7H_{15}$
$CF_3(CF_2)_4CHOHC_8H_{17}$
$CF_3(CF_2)_5CHOHC_2H_5$
$CF_3(CF_2)_5CHOHC_3H_7$
$CF_3(CF_2)_5CHOHC_4H_9$
$CF_3(CF_2)_5CHOHC_5H_{11}$
$CF_3(CF_2)_5CHOHC_6H_{13}$
$CF_3(CF_2)_5CHOHC_7H_{15}$
$CF_3(CF_2)_5CHOHC_8H_{17}$
$CF_3C(CH_3)_2OH$
$CF_3C(C_2H_5)_2OH$
$CF_3C(C_3H_7)_2OH$
$CF_3C(C_4H_9)_2OH$

The fluorinated alcohols may be primary, secondary or tertiary. The fluorinated alkoxyalkanols particularly include those represented by the following formulas:

$C_2H_5OCH_2CF_2CF_2CH_2OH$
$C_3H_7OCH_2CF_2CF_2CH_2OH$
$C_4H_9OCH_2CF_2CF_2CH_2OH$
$C_5H_{11}OCH_2CF_2CF_2CH_2OH$
$C_6H_{13}OCH_2CF_2CF_2CH_2OH$
$C_2H_5OCH_2CF_2CF_2CF_2CH_2OH$
$C_3H_7OCH_2CF_2CF_2CF_2CH_2OH$
$C_4H_9OCH_2CF_2CF_2CF_2CH_2OH$
$C_5H_{11}OCH_2CF_2CF_2CF_2CH_2OH$
$C_6H_{13}OCH_2CF_2CF_2CF_2CH_2OH$
$C_2H_5OCH_2(CF_2)_4CH_2OH$
$C_3H_7OCH_2(CF_2)_4CH_2OH$
$C_4H_9OCH_2(CF_2)_4CH_2OH$
$C_5H_{11}OCH_2(CF_2)_4CH_2OH$
$C_6H_{13}OCH_2(CF_2)_4CH_2OH$

The foregoing describes my invention in its preferred aspects, and illustrates my invention by way of specific embodiments and specific examples, but alterations and modifications may be made thereof without departing from the invention herein disclosed and claimed.

Having described my invention, I claim:

1. The method of making a mixed fluorinated-alkyl aryl phosphate ester having one substituent selected from the group consisting of an aryl radical having from 6 to 10 carbon atoms, one substituent selected from the group consisting of a fluorinated alkyl radical having at least two fluorine atoms on the carbon atom bonded to the carbinol carbon atom and the carbinol carbon atom in addition to being bonded to oxygen is bonded only to atoms which are members of the group consisting of hydrogen and carbon, and a fluorinated alkoxyalkyl radical having at least two fluorine atoms on the carbon atom bonded to the carbinol carbon atom and the carbinol carbon atom in addition to being bonded to oxygen is bonded only to atoms which are members of the group consisting of hydrogen and carbon, and having at least two carbon atoms in the alkyl portion thereof, and the other substituent selected from the group consisting of an aryl radical having from 6 to 10 carbon atoms, a fluorinated alkyl radical having at least two fluorine atoms on the carbon atom bonded to the carbinol carbon atom and the carbinol carbon atom in addition to being bonded to oxygen is bonded only to atoms which are members of the group consisting of hydrogen and carbon, and a fluorinated alkoxyalkyl radical having at least two fluorine atoms on the carbon atom bonded to the carbinol carbon atom and the carbinol carbon atom in addition to being bonded to oxygen is bonded only to atoms which are members of the group consisting of hydrogen and carbon, and having at least two carbon atoms in the alkyl portion thereof, which comprises reacting a phosphorous oxychloride with an aqueous solution of a mixture of an alkali metal salt of an aromatic alcohol and a fluorinated aliphatic alcohol having at least two fluorine atoms on the carbon atom bonded to the carbinol carbon atom and the carbinol carbon atom in addition to being bonded to oxygen is bonded only to atoms which are members of the group consisting of hydrogen and carbon selected from the group consisting of a fluorinated alkanol and a fluorinated alkoxyalkanol.

2. The method as defined in claim 1 in which the alkali metal is sodium.

3. The method of making a fluoralkyl-aryl phosphate which comprises reacting phosphorous oxychloride with a mixture of alkali metal salts of an aromatic alcohol and a fluorinated alcohol having at least two fluorine atoms on the carbon atom bonded to the carbinol carbon atom and the carbinol carbon atom in addition to being bonded to oxygen is bonded only to atoms which are members of the group consisting of hydrogen and carbon and thereby substituting fluorinated alkoxy and aroxy for the chlorine of the phosphorous oxychloride.

4. The method of making a monofluoroalkyl diaryl phosphate which comprises reacting phosphorous oxychloride with a mixture of an alkali metal salt of an aromatic alcohol in two molar amounts with respect to said phosphorous oxychloride and an alkali metal salt of a fluorinated alcohol in one molar amount with respect to said phosphorous oxychloride, said fluorinated alcohol having at least two fluorine atoms on the carbon atom bonded to the carbinol carbon atom and the carbinol carbon atom in addition to being bonded to oxygen is bonded only to atoms which are members of the group consisting of hydrogen and a carbon and thereby substituting fluorinated alkoxy for one chlorine of said phosphorous oxychloride and substituting aroxy for the other two chlorines of said phosphorous oxychloride.

5. The method of making a mono-aryl di-fluoroalkyl phosphate which comprises reacting phosphorous oxychloride with a mixture of an alkali metal salt of an aromatic alcohol in one molar amount with respect to said phosphorous oxychloride and an alkali metal salt of a fluorinated alcohol in two molar amounts with respect to said phosphorous oxychloride, said fluorinated alcohol having at least two fluorine atoms on the carbon atom bonded to the carbinol carbon atom and the carbinol carbon atom in addition to being bonded to oxygen is bonded only to atoms which are members of the group consisting of hydrogen and carbon and thereby substituting fluorinated alkoxy for two chlorines of said phosphorous oxychloride and substituting aroxy for the other chlorine of said phosphorous oxychloride.

6. The method as defined in claim 5 in which the alkali metal is sodium.

7. The method of making a mixture of phosphate esters which comprises reacting phosphorous oxychloride with a mixture of an alkali metal salt of an aromatic alcohol and a fluorinated aliphatic alcohol having at least two fluorine atoms on the carbon atom bonded to the carbinol carbon atom and the carbinol carbon atom in addition to being bonded to oxygen is bonded only to atoms which are members of the group consisting of hydrogen and carbon selected from the group consisting of a fluorinated alkanol and a fluorinated alkoxyalkanol and thereby substituting for the chlorine of the phosphorous oxychloride.

8. The method of making monophenyl di-2,2,3,3,4,4,4-heptafluorobutyl phosphate which comprises reacting phosphorous oxychloride with an aqueous solution of one molal proportion of the sodium salt of phenol and two molal proportions of sodium heptafluorobutyl alcoholate and thereby substituting two 2,2,3,3,4,4,4-heptafluorobutoxy radicals for two chlorine atoms of the phosphorous oxychloride and one phenoxy radical for the other chlorine atom.

9. The method of making mono-2,2,3,3,4,4,4-heptafluorobutyl diphenyl phosphate which comprises reacting phosphorous oxychloride with an aqueous solution of two molal proportions of the sodium salt of phenol and one molal proportion of sodium heptafluorobutyl alcoholate and thereby substituting one 2,2,3,3,4,4,4-heptafluorobutoxy radical for one chlorine atom of the phosphorous oxychloride and two phenoxy radicals for the other chlorine atoms.

10. The mixture of phosphates resulting from the method as defined in claim 1.

11. The mixture of phosphate esters resulting from the method as defined in claim 7.

12. The composition comprising tris-2,2,3,3,4,4,4-heptafluorobutyl phosphate, di-2,2,3,3,4,4,4-heptafluorobutyl phenyl phosphate, 2,2,3,3,4,4,4-heptafluorobutyl di-phenyl phosphate and triphenyl phosphate.

13. The composition comprising tris-2,2,3,3,4,4,4-heptafluorobutyl phosphate, di-2,2,3,3,4,4,4-heptafluorobutyl phenyl phosphate and 2,2,3,3,4,4,4-heptafluorobutyl diphenyl phosphate.

14. The composition comprising di-2,2,3,3,4,4,4-heptafluorobutyl phenyl phosphate and 2,2,3,3,4,4,4-heptafluorobutyl di-phenyl phosphate.

15. A new chemical compound represented by the formula

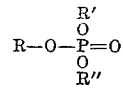

in which R represents an aryl radical with benzene nucleus having from 6 to 10 carbon atoms, R' is a member of the group consisting of a fluorinated alkyl radical having from 2 to 10 carbon atoms and having a fluorinated carbon atom with at least 2 fluorine atoms bonded to the carbon atom connected to an oxygen of the phosphate radical and the carbon bonded to the oxygen of the phosphate radical is bonded in addition to the bond to this oxygen only to atoms which are members of the group consisting of hydrogen and carbon and a fluorinated alkoxyalkyl radical containing from 3 to 10 carbon atoms with at least 2 carbon atoms in the alkyl portion thereof and having a fluorinated carbon atom with at least 2 fluorine atoms bonded to the carbon atom connected to an oxygen of the phosphate radical and the carbon bonded to the oxygen of the phosphate radical is bonded in addition to the bond to this oxygen only to atoms which are members of the group consisting of hydrogen and carbon; and R'' is a member of the group consisting of an aryl radical with benzene nucleus having from 6 to 10 carbon atoms and is represented by the formula $C_nH_{(2n-7)}$ in which $n$ is from 6 to 10, a fluorinated alkyl radical having from 2 to 10 carbon atoms and having a fluorinated carbon atom with at least 2 fluorine atoms bonded to the carbon atom connected to an oxygen of the phosphate radical and the carbon bonded to the oxygen of the phosphate radical is bonded in addition to the bond to this oxygen only to atoms which are members of the group consisting of hydrogen and carbon and a fluorinated alkoxyalkyl radical containing from 3 to 10 carbon atoms with at least 2 carbon atoms in the alkyl portion thereof and having a fluorinated carbon atom with at least 2 fluorine atoms bonded to the carbon atom connected to an oxygen of the phosphate radical and the carbon bonded to the oxygen of the phosphate radical is bonded in addition to the bond to this oxygen only to atoms which are members of the group consisting of hydrogen and carbon.

16. A mixed fluoroalkyl-aryl phosphate having at least one fluorinated alkyl substituent with from 2 to 10 carbon atoms and in which the aryl portion has a benzene nucleus and is represented by the formula $C_nH_{(2n-7)}$ in which $n$ is from 6 to 10.

17. A monofluoroalkyl diaryl phosphate in which said fluoroalkyl radical has from 2 to 10 carbon atoms and said aryl radical has a benzene nucleus and from 6 to 10 carbon atoms and is represented by the formula $C_nH_{(2n-7)}$ in which $n$ is from 6 to 10.

18. A di-fluoroalkyl monoaryl phosphate in which said fluoroalkyl radicals have from 2 to 10 carbon atoms and said aryl radical has a benzene nucleus and from 6 to 10 carbon atoms and is represented by the formula $C_nH_{(2n-7)}$ in which $n$ is from 6 to 10.

19. Mono-2,2,3,3,4,4,4-heptafluorobutyl diphenyl phosphate.

20. Di-2,2,3,3,4,4,4-heptafluorobutyl phenyl phosphate.

References Cited in the file of this patent
UNITED STATES PATENTS
2,559,749   Benning _____ July 10, 1951

OTHER REFERENCES
Autenrieth: Ber. Deut. Chem., vol. 30, pp. 2369–2373 (1897).